United States Patent [19]

Shimizu

[11] Patent Number: 5,408,637
[45] Date of Patent: Apr. 18, 1995

[54] EMULATION TECHNIQUES GIVING NECESSARY INFORMATION TO A MICROCOMPUTER TO PERFORM SOFTWARE DEBUG AND SYSTEM DEBUG EVEN FOR INCOMPLETE TARGET SYSTEM

[75] Inventor: Hisayoshi Shimizu, Kodaira, Japan

[73] Assignee: Hitachi, Ltd., Tokyo, Japan

[21] Appl. No.: 806,643

[22] Filed: Dec. 13, 1991

[30] Foreign Application Priority Data

Dec. 27, 1990 [JP] Japan .................. 2-414904

[51] Int. Cl.[6] ............................................. G06F 11/00
[52] U.S. Cl. ................................. 395/500; 395/800; 364/578; 364/DIG. 2; 364/927.81
[58] Field of Search ............... 395/500, 800; 364/149, 364/578, 707; 371/19, 22.2, 22.1, 22.6

[56] References Cited

U.S. PATENT DOCUMENTS

| | | | |
|---|---|---|---|
| 4,084,869 | 4/1978 | Yen | 339/17 |
| 4,674,089 | 6/1987 | Poret et al. | 395/500 |
| 4,740,895 | 4/1988 | Sargent et al. | 395/575 |
| 4,782,461 | 11/1988 | Mick et al. | 395/500 |
| 4,785,416 | 11/1988 | Stringer | 395/500 |
| 4,847,805 | 7/1989 | Ishii et al. | 395/500 |
| 5,109,353 | 4/1992 | Sample et al. | 371/22.2 |
| 5,228,039 | 7/1993 | Knoke et al. | 371/19 |

FOREIGN PATENT DOCUMENTS 62-173539 7/1987 Japan .
64-41938 2/1989 Japan .

OTHER PUBLICATIONS

HMCS400 Series Emulator Unit User's Manual, Hitachi, Ltd., 1991, pp. 36–44 and 181. (Provided in English).
HMCS400 Series Microcomputers User's Manual, Hitachi, Ltd., 1989, p. 49. (Provided in English).

*Primary Examiner*—Alyssa H. Bowler
*Assistant Examiner*—Mehmet Geckil
*Attorney, Agent, or Firm*—Fay, Sharpe, Beall, Fagan, Minnich & McKee

[57] ABSTRACT

An emulation apparatus is capable of setting conditions to be noticed in a programmable manner, and includes a programmable output circuit having a timing detection circuit for detecting establishment of the set conditions on referring to information and the like on an emulation bus, and data storage groups for outputting data previously stored in a programmable manner, corresponding to the condition detected by the circuit. A part of output information of the programmable output circuit is capable of being selected by a selection circuit to be supplied, instead of output information of the corresponding portion of a user's system, to a microcomputer for emulation. The programmable output circuit includes a delay circuit for delaying the output data and effectively emulates I/O ports of the target machine.

10 Claims, 12 Drawing Sheets

TIMING DETECTION CONDITIONS (-; DON'T CARE)

1 ; OUTPUT OF LOGIC 1

0 ; OUTPUT OF LOGIC 0

X ; HIGH OUTPUT INPEDANCE

FIG. 6

EXAMPLE OF CONTENTS OF RAM 11

| ADDRESS | DATA | |
|---|---|---|
| 0000 | 00000000 | ····· WITHOUT CONDITION |
| . | . | . |
| . | . | . |
| . | . | . |
| 05D0 | 00000000 | ····· WITHOUT CONDITION |
| 05D1 | 00000011 | ····· CONDITION 3 |
| 05D2 | 00000000 | ····· WITHOUT CONDITION |
| . | . | . |
| . | . | . |
| . | . | . |
| 0FFF | 00000000 | ····· WITHOUT CONDITION |
| 1000 | 00000001 | ····· CONDITION 1 |
| 1001 | 00000000 | ····· WITHOUT CONDITION |
| . | . | . |
| . | . | . |
| . | . | . |
| 243E | 00000000 | ····· WITHOUT CONDITION |
| 243F | 00000010 | ····· CONDITION 2 |
| 2440 | 00000000 | ····· WITHOUT CONDITION |
| . | . | . |
| . | . | . |
| . | . | . |
| 8401 | 00000000 | ····· WITHOUT CONDITION |
| 8402 | 00000100 | ····· CONDITION 4 |
| 8403 | 00000000 | ····· WITHOUT CONDITION |
| . | . | . |
| . | . | . |
| . | . | . |
| FFFF | 00000000 | ····· WITHOUT CONDITION |

FIG. 7

EXAMPLE OF CONTENTS OF RAM 21

|  | ADDRESS | DATA |
|---|---|---|
| INITIAL STATE | 00 | 00000000 |
| CONDITION 1 | 01 | 00000001 |
| CONDITION 2 | 02 | 00000011 |
| CONDITION 3 | 03 | 00001000 |
| CONDITION 4 | 04 | 00000001 |
| CONDITION 5 | 05 | . |
| CONDITION 6 | 06 | . |
| . | . | . |
| CONDITION 255 | FF | 00000000 |

—77 (highlighting the rightmost bits of conditions 1–4)

PORT 18
PORT 17
PORT 16
PORT 15
PORT 14
PORT 13
PORT 12
PORT 11

NOTE) 1 : "H" LEVEL
2 : "L" LEVEL

FIG. 8

EXAMPLE OF CONTENTS OF RAM 31

|  | ADDRESS | DATA |
|---|---|---|
| INITIAL STATE | 0 0 | 0 0 0 0 0 0 0 0 |
| CONDITION 1 | 0 1 | 0 0 0 0 0 0 1 1 |
| CONDITION 2 | 0 2 | 0 0 0 0 0 0 1 1 |
| CONDITION 3 | 0 3 | 0 0 0 0 1 0 1 1 |
| CONDITION 4 | 0 4 | 0 0 0 0 1 0 1 1 |
| CONDITION 5 | 0 5 | . |
| CONDITION 6 | 0 6 | . |
| ... | ... | ... |
| CONDITION 255 | F F | 0 0 0 0 0 0 0 0 |

88

CONT 18
CONT 17
CONT 16
CONT 15
CONT 14
CONT 13
CONT 12
CONT 11

NOTE ) 1 : DRIVER SELECTION
2 : HIGH INPEDANCE (X)

FIG.9

|  | PORT 11 | PORT 12 | PORT 13 | PORT 14 | ··· | PORTn8 |
|---|---|---|---|---|---|---|
| CASE 1 → | 1 | 1 | 1 | 1 | ··· | 1 |

|  | PORT 11 | PORT 12 | PORT 13 | PORT 14 | ··· | PORTn8 |
|---|---|---|---|---|---|---|
| CASE 2 → | 0 | 0 | 0 | 0 | ··· | 0 |

|  | PORT 11 | PORT 12 | PORT 13 | PORT 14 | ··· | PORTn8 |
|---|---|---|---|---|---|---|
| CASE 3 → | 0 | 0 | 0 | 1 | ··· | 1 |

1 : SELECTION OF CONNECTION TO
    PROGRAMMABLE OUTPUT CIRCUIT

0 : SELECTION OF CONNECTION TO
    USER PRACTICAL APPARATUS

EMULATION TECHNIQUES GIVING NECESSARY INFORMATION TO A MICROCOMPUTER TO PERFORM SOFTWARE DEBUG AND SYSTEM DEBUG EVEN FOR INCOMPLETE TARGET SYSTEM

BACKGROUND OF THE INVENTION

The present invention relates to an emulator and an emulation method which are capable of performing debug even in the case where the whole target system or a part thereof is not present and more particularly to a technology which is suitable for being applied to an emulator for a single chip microcomputer applied apparatus for example.

An emulator enables system debug or software debug to be performed while emulating a system which is an object of debug (i.e., a target system) with a microcomputer for emulation. Therefore, before the completion of the target system, it is difficult to perform the software debug for supporting an exchange of a signal between an I/O apparatus of the target system and the microcomputer is supported to be executed, or the total system debug covering the whole system. As a result, it is necessary to rely on the completion of the practical system as a target system.

A technology relating to a connection between an emulator and a microcomputer circuit board is disclosed in the U.S. Pat. No. 4,084,869. As a technology relating an emulator for emulating a target, and for enabling emulation to be performed without provision of a target system, there are proposed articles "HMCS 400-Series Emulator Unit: User's Manual; 1991, pp. 181" and "HMCS 400-Series Microcomputers: User's Manual; 1989, pp. 49", and JP-A-64-41938 (the term "JP-A" used herein means that the patent application was laid open to public inspection but has not been examined) and JP-A-62-173539. The technique described in JP-A-64-41938 is designed in such a way that when detecting an input instruction for a microcomputer for emulation, pattern data are generated to be directly supplied to the microcomputer for emulation while updating addresses of a memory for holding an input pattern, and when detecting an output instruction therefor, output pattern data from the microcomputer for emulation are written to a data memory while updating addresses of the data memory for holding output data. The technique described in JP-A-62-173539 is designed in such a way that pattern data are stored in an emulation memory in which addresses are updated in sequence every bus cycle of a microcomputer for emulation, and the pattern data are supplied in sequence to the microcomputer for emulation whenever the bus cycle is started.

However, each of the above-mentioned prior art systems is arranged in such a way that the pattern data are mechanically outputted in regular order to the microcomputer for emulation using the detection result of the input instruction or the start of the bus cycle as a trigger. Therefore, the order of output of the data must be previously determined and the determination result must be stored in the memory. For that purpose, it is necessary to predict the operation flow of the microcomputer for emulation. Therefore, with respect to the operation which deviated from the flow thus predicted, it is impossible to perform the emulation. For example, in the case where an interrupt routine, a conditional branch, or the like is present in the operation flow of the microcomputer for emulation, it is substantially impossible to predict an external interruption or the like which occurs asynchronously. Then, if an input instruction contrary to the prediction, the normal emulation can be performed no longer. With the arrangement as well in which the pattern data are supplied every bus cycle of the CPU, similarly, if an interruption occurs at a timing other than the predicted timing, or a branch contrary to the prediction occurs, the emulation cannot be performed. As a result, even if the emulation can be performed without provision of the target system, such emulation can be performed by only treating a range in which the number of steps capable of being emulated is very small so as to enable the operation flow to be surely predicted, as a unit.

SUMMARY OF THE INVENTION

It is therefore an object of the present invention to provide an emulator which is capable of giving necessary information to a microcomputer for emulation to perform software debug and system debug in a relatively simple manner and even in the case where a target system is incomplete.

It is another object of the present invention to provide an emulation system which performs emulation by supplying desired pattern data while connecting composing elements of a partially completed target system to one another.

It is still another object of the present invention to provide a simulator which is capable of reducing a load, which is predicted for execution, in debugging a program including a condition judgement step in a target system.

It is yet another object of the present invention to provide a system which is capable of simulating a delayed signal obtained from actual I/0 ports in a target system by providing a circuit for simulating partially incomplete portions in the target system with a delay circuit.

A simulator according to the present invention is capable of setting a condition to be noticed in a programmable manner and includes a programmable output circuit provided with a timing detector for detecting establishment of the set condition during execution of a target program, and an output data storage unit for outputting data previously stored in a programmable manner in accordance with the condition detected by the timing detector. In this connection, the output information of the programmable output circuit is, instead of the output information of a target system, supplied to a microcomputer for emulation.

The timing detector means can be arranged in a relatively simple manner by including RAMs to which desired conditions can be written in a programmable manner and which are read out and accessed by a data signal, an address signal, a strobe signal and the like inputted or outputted to or from the microcomputer for emulation, and logic circuits for detecting establishment of the above conditions using outputs of the RAMs as the inputs thereof.

For the purpose of enabling the timing setting for making the amount of the transmission delay of the information supplied from the programmable output circuit match with that of the transmission delay of the information actually supplied from the target system through the interface cable to be performed, there may be provided a delay unit for arbitrarily delaying the output timing of the programmable output circuit with respect to the detection timing by the timing detector means.

Moreover, considering that the programmable output circuit is jointly used with the target system to enable the emulation to be performed, the selection circuit may have selection switches which are capable of switching the selection circuit to outputs of the programmable output circuit to connect it thereto and are provided in respective signal lines for interfacing the microcomputer for emulation to the target system, and the connection states of the individual switches may be controlled in a programmable manner in accordance with the information held in the storage unit.

According to the above-mentioned system, in a state in which the target system is incomplete, when the software debug of the I/0 program which is executed by exchanging the information between the partially incomplete I/0 apparatus and the microcomputer for emulation, and the total software debug covering the whole system are performed, the timing at which the programmable output circuit for emulating a signal from the incomplete portion is to output a signal to the microcomputer for emulation is set with the condition thereof in a programmable manner in accordance with the address value, the data value or the like provided on the emulation bus at this time, and the timing detector of which condition has been set detects that condition on the basis of the data value or the like on the emulation bus during the execution of the target program, whereby the corresponding data stored previously in the output data storage unit in the programmable manner are supplied to the microcomputer for emulation in a simulated manner. Since the pseudo-signal is supplied to the microcomputer for emulation depending on whether or not the condition set to the programmable output circuit is established, there is no need for predicting which instruction execution flow the processing follows in the process of establishing the set condition. Moreover, even if the execution flow is contrary to the prediction, the necessary information is supplied to the microcomputer for emulation in confirmity with the actual instruction execution flow to perform the emulation.

BRIEF DESCRIPTION OF THE DRAWINGS

FIG. 6 is a diagram useful in explaining an example of storage information of a RAM 11 used for setting address conditions within the timing detection conditions of FIGS. 5A and 5B;

FIG. 7 is a diagram useful in explaining an example of storage information of a RAM 21 used for obtaining substitute data of FIGS. 5A and 5B;

FIG. 8 is a diagram useful in explaining an example of storage information of a RAM 31 used for obtaining substitute data of FIGS. 5A and 5B;

FIG. 9 is a diagram useful in explaining typical three aspects of output selection states of a programmable output circuit by the selection circuit;

DESCRIPTION OF THE PREFERRED EMBODIMENTS

Figure 1:
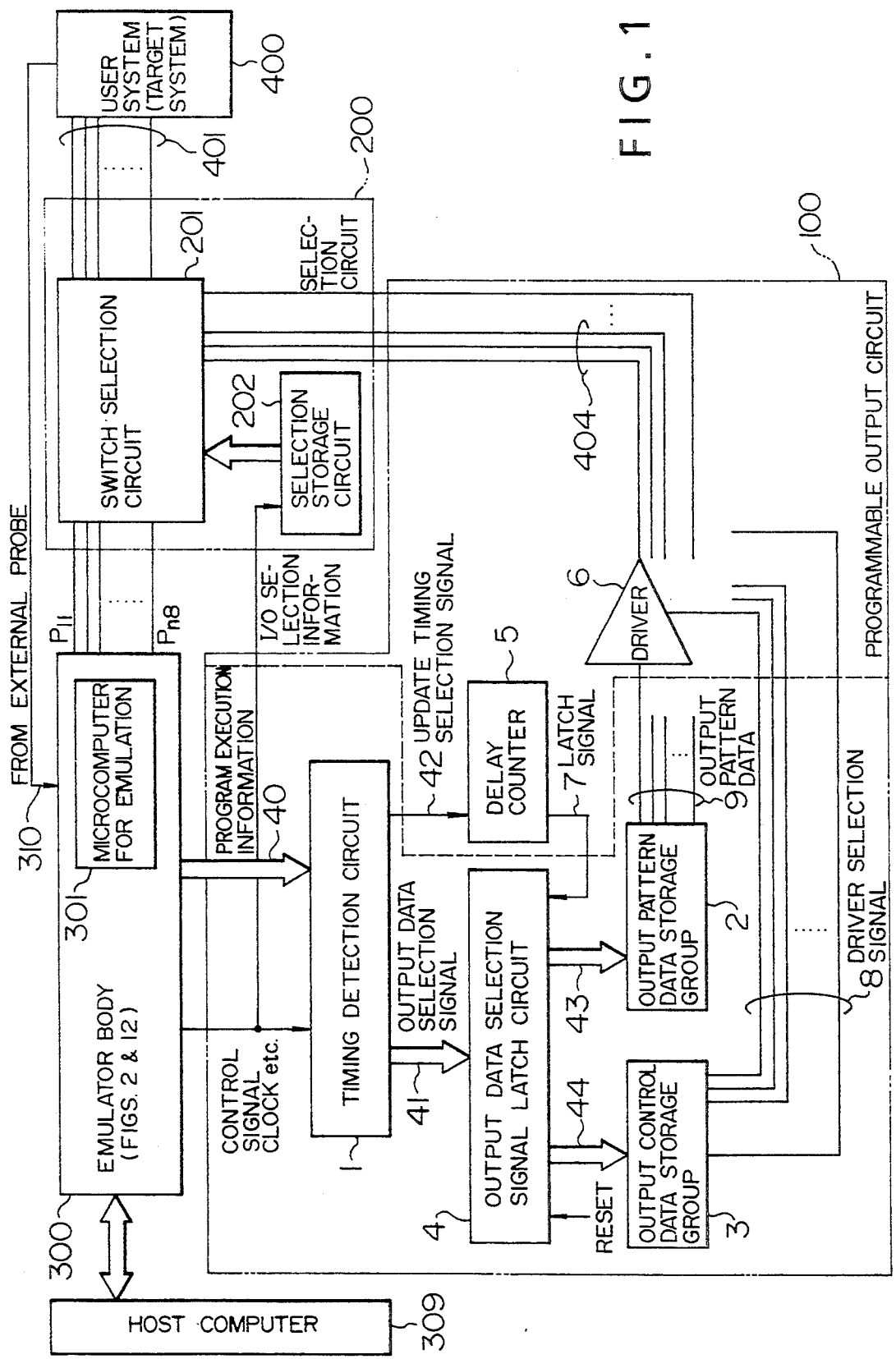
FIG. 1 is a block diagram showing the arrangement of one embodiment of an emulator according to the present invention.

In FIG. 1, there is shown an emulator according to one embodiment of the present invention. Although the arrangement of the emulator shown in FIG. 1 is not especially limited, the emulator is made up of a programmable output circuit 100, a selection circuit 200 and an emulator body 300. The emulator body 300 includes a microcomputer for emulation 301. When the microcomputer for emulation 301 substitutively emulates for a target microcomputer of a target system (hereinafter, also referred to as simply "a user's system", when applicable) 400, the microcomputer 301 is electrically connected through the selection circuit 200 to the user's system 400 by an interface cable 401. The emulator body 300 is also interfaced to a host computer or system development apparatus 309 for preparing a machine program to perform the control of the internal portion of the emulator, the down load of a target program (hereinafter, also referred to as simply "a user program", when applicable) from the host computer 309 to the emulator 300, issue of a control command to the emulator 300, display or storing of data, machine language or character strings from the emulator and the like. The signal output conditions or the data are set to the programmable output circuit 100 in a programmable manner in accordance with an instruction from the system development apparatus 309 and instead of the user practical system, the circuit 100 supplies the predetermined data to the microcomputer for emulator 301 through the selection circuit 200 in a simulated manner in accordance with the set conditions.

Figure 2:
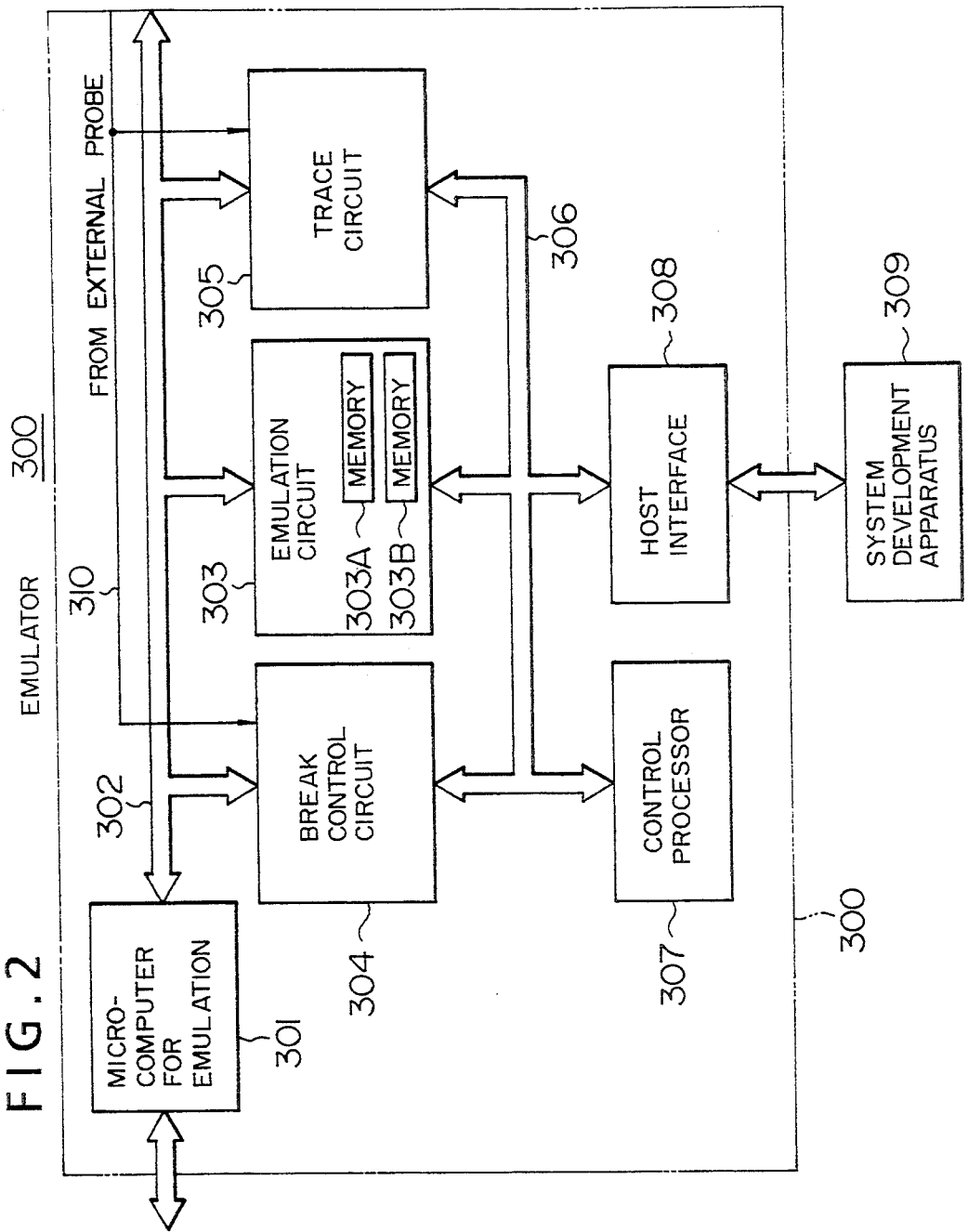
FIG. 2 is a block diagram showing the detail arrangement of one example of the emulator body.

Then, one example of the emulator body 300 will first be described by referring to FIG. 2.

The microcomputer for emulation 301 has the control facility and the peripheral facility which are equal to those of target microcomputer (not shown) mounted in the user's system 400, and is connected to a target microcomputer mounting area of the user's system 400 through the interface cable 401. The microcomputer for emulation 301 is not especially limited with the arrangement thereof. However, the microcomputer for emulation 301 is arranged in such a way as to add additional logic to the logic of the target microcomputer (not shown) or change the logic thereof in a desired manner to execute the target program while transmitting or receiving to or from the other circuit portions of the emulator body 300, thus enabling the user's system 400 to be emulated. Incidentally, the microcomputer for emulation itself has already been well known, and therefore, the details thereof are not shown for brevity.

The information exchanged between the user's system 400 and the microcomputer for emulation 301 and the information relating to the internal state of the microcomputer for emulation 301 are also supplied to an emulation bus 302. The initial conditions for emulation and the control information therefor are applied to the microcomputer for emulation 301 and the like through the emulator bus 302.

Although not limited especially, the emulation bus 302 has an emulation circuit 303, a break control circuit 304 and a trace circuit 305 connected thereto. These circuits are also connected to a control bus 306 and are selectively interfaced to the emulator bus 302 or the control bus 306 on the basis of control of a control processor 307 connected to the control bus 306. Although not limited especially, the emulation circuit 303 includes a RAM or substitute memories 303A and 303B for substitutively acting for the data memory and the program memory in the user's system 400 or the target microcomputer, and a control register (not shown) for controlling the emulation operation on the basis of the starting conditions, various control conditions and the like for emulation. The down load of the target program from the system development apparatus 309 to the substitute memories 303A and 303B, the data transmission and the initialization to the control register (not shown) are performed before the start of the emulation through the control bus 306 by a control processor 307. Although not limited especially, the break control circuit 304 is arranged in such a way as to monitor the control state of the microcomputer for emulation 301 and the state of the emulation bus 302 to break the emulation operation when those states reach the predetermined states, respectively. The setting of the break conditions to the break control circuit 304 is similarly performed before the start of the emulation through the control bus 306 by the control processor 307. The trace circuit 305 serves to trace successively the data, the address, the control information and the like supplied to the emulation bus 302 and the like every bus cycle during the emulation operation. The emulation circuit 303, the break control circuit 304 and the trace circuit 305 are controlled through the control bus 306 by the control processor 307. In this connection, the control bus 306 is connected through a host interface 308 to the system development apparatus 309 which is constructed by a personal computer but is limited thereto especially. The control processor 307 of interest controls the whole emulation operation by the emulation body 300 on the basis of the commands and the various control information supplied from the system development apparatus 309.

Referring to FIG. 1, the programmable output circuit 100 includes a timing detection circuit 1, an output control data storage group 3, an output pattern data storage group 2, an output data selection signal latch circuit 4, a delay counter 5 and a plurality of output drivers 6 (in the figure, one output driver is typically shown), and produces the whole or a part of a signal which is to be supplied from the user practical system 400 to the microcomputer for emulation 301, in a programmable manner. The timing circuit 1 is capable of setting a plurality of conditions to be noticed in a programmable manner and detects the establishment of the conditions thus set during the execution of the target program by the microcomputer for emulation 301, on the basis of the information and the like on the emulation bus 302. The output data selection signal latch circuit 4 latches the information which is outputted on the basis of the detection of the conditions by the timing detection circuit 1, and the latch timing thereof is controlled by a latch signal 7 outputted from the delay counter 5 for setting a predetermined time therein. A time which is determined by considering the time difference between the steps apart from each other in the program may be set to the delay counter 5. The output control data storage group 3 and the output pattern data storage group 2 output respective data under a condition of the information which is detected by the timing detection circuit 1 to be supplied through the output data selection signal latch circuit 4. The data to be outputted are capable of being set previously from the latch circuit 4 via the control bus 306 to the storage groups 3 and 2 through buses 44 and 43 by the control processor 307 in a programmable manner. Each of the output drivers 6 is constructed by a tri-state type output buffer which is capable of selectively obtaining one of a high level state, a low level state and a high output impedance state. The output drivers 6 control whether or not the outputs of the associated output drivers 6 are made to be in the high impedance state by driver selection signals 8 outputted from the output control data storage group 3. The output logical levels of the output drivers 6 are determined by output pattern data 9 outputted from the output pattern data storage group 2. When the switch selection circuit 201 selects the line 404 so that the drivers 6 are connected thereto, and a signal is outputted from the MCU 301, the outputs of the drivers 6 are programmed to set at the high impedance state.

Figure 3:
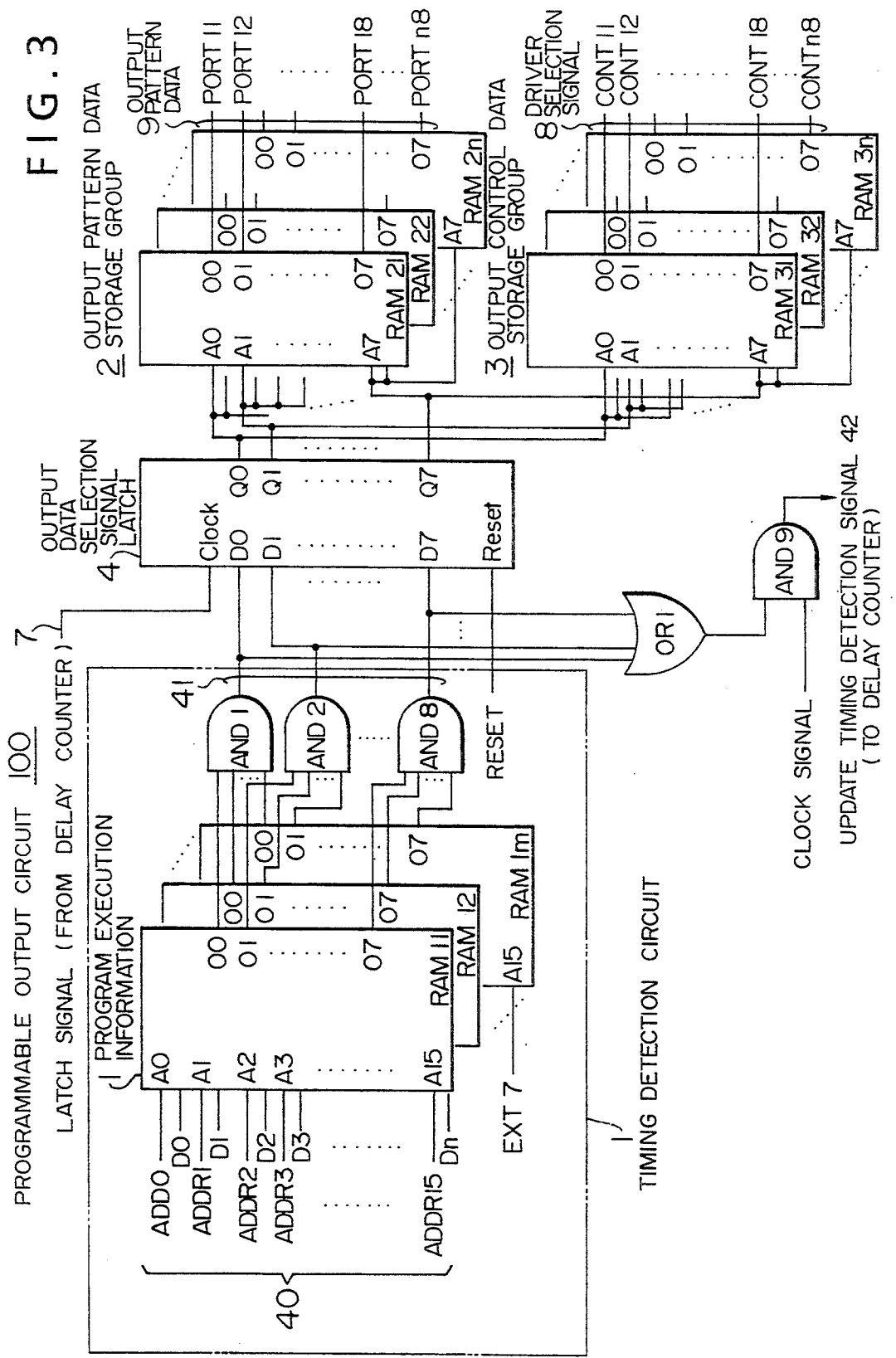
FIG. 3 is a block diagram showing the detail arrangement of one example of a programmable output circuit.

In FIG. 3, there is shown the detail arrangement of the programmable output circuit 100.

Although not limited especially, the timing detection circuit 1 includes m random access memories (RAMs) 11 through 1m as storage means. Each of the RAMs has 16 bit-address input terminals A0 through A15 and 8 bit-data I/O terminals 00 through 07. During the writing of the conditions to the RAMs 11 through 1m, the address input terminals A0 through A15 and the data I/O terminals 00 through 07 are interfaced through selector gates (not shown) to the control bus 306 shown in FIG. 2 and are subjected to the access control by the control processor 307, so that desired conditions are set to the RAMs 11 through 1m. Now, the conditions set to the RAMs 11 through 1m are determined by both the addresses which are used when accessing to the RAMs 11 through 1m for writing operation, and the writing data. During the emulation operation in which the microcomputer for emulation 301 executes the user program, the address input terminals A0 through A15 are interfaced through the selector gates (not shown) to the emulation bus 302. The program execution information 40 such as address signals ADDR0 through ADDR15 on the emulation bus 302, data signals D0 through D7, a strobe signal, and signals EXT0 through EXT7 of an external probe (not shown) used for fetching therein the data on the user practical system is supplied through the emulator 300 to the timing detection circuit 1. By performing the read operation using such information as addresses, the data written previously are read out from the RAMs 11 through 1m in accordance with the state of the emulation operation. With the data read out from the RAMs 11 through 1m, the signal groups having the respective same bits are inputted to the associated input AND gates AND1 through AND8 of which parallel outputs are supplied as an output data selection signal 41 to the latch circuit 4.

In this timing detection circuit 1, the output data selection signal 41 of 8 bits outputted from the AND gates AND1 through AND8 means whether or not the conditions are established. Therefore, in the present embodiment, the kind of conditions which are previously programmed in the timing detection circuit 1 and are capable of being detected is 256. For example, assuming that with only the least significant bit (LSB) of the output data selection signal 41 of 8 bits, the state of "the logic 1" coincides with the establishment state of the condition 1, in order to obtain this state, it is required that with only the AND gate AND1, all the inputs thereof coincide with "the logic 1". Therefore, when the conditions of the addresses ADDR1 through ADDR15, the data D0 through D8 and the like corresponding to the condition 1 are set to the RAMs 11 through 1m, the conditions of the address pattern and data pattern thereof are supplied to the address inputs ADDs of the RAMs 11 through 1m and the data are written in such a way that when reading out such conditions from the RAMs, with only the AND gate AND1, all the inputs coincide with the "the logic 1". Thus, the condition setting is performed.

According to the present embodiment, even in the case where one of 256 kinds of conditions is established, out of 8 bits of the output data selection signal 41, one bit is made to coincide with "the logic 1". An OR gate OR1, which receives the outputs of the AND gates AND1 through AND8 as 8 inputs, is provides. The output of the OR gate OR1 is outputted from the AND gate AND9 synchronistically with a cycle of a clock signal to produce an update timing detection signal 42. The clock signal is a signal synchronizing with the bus cycle, or a signal synchronizing with the operation clock signal of the microcomputer for emulation 301.

Although not limited especially, the delay counter 5 is a down counter or an up counter with a preset facility (not shown). This counter always holds therein a preset value which is initialized by the control processor 30, increments or decrements an operation reference clock signal of the microcomputer for emulation 301 until the level of the operation reference clock signal reaches the preset value, and asserts a latch signal 7 every generation of a borrow or a carrier. The latch signal 7, the borrow or the carrier is also used as the reset signal of the counter 5. The output selection signal latch circuit 4 latches the output data selection signal 41 outputted from the AND gates AND1 through AND8 every assertion of the latch signal 7 to transmit the signal 7 to the subsequent stage. Therefore, by setting the preset value of the delay counter 5 in a programmable manner, the output data selection signal 41 can be transmitted to the subsequent stage with an arbitrary timing.

Although not limited especially, the output pattern data storage group 2 includes n random access memories (RAMs) 21 through 2n as storage means. Each of the RAMs has 8bit-address input terminals A0 through A7 and 8bit-data I/O terminals 00 through 07. Moreover, although not limited especially, the output control data storage group 3 includes n RAMs 31 through 3n as storage means. Each of the RAMs has 8bit-address input terminals A0 through A7 and 8bit-data I/O terminals 00 through 07. The address input terminals of the RAMs corresponding to the respective same bits are connected to one another. During the writing of the data to the RAMs 21 through 2n and RAMs 31 through 3n, the address input terminals A0 through A7 and the data I/O terminals 00 through 07 are interfaced through selector gates (not shown) to the control bus 306 and are subjected to the access control by the control processor 307, thereby to perform the writing of the data. During the emulation operation in which the microcomputer for emulation 301 executes the user program, the outputs of the AND gates AND1 through AND8 are supplied through the output data selection signal latch circuit 4 to the address input terminals A0 through A7. By performing the read operation using such outputs as addresses, the data in correspondence to the condition detected by the timing detection circuit 1 are read out from the output control data storage group 3 and the output pattern data storage group 2, corresponding to the state of the emulation operation. The output operation of the output driver 6 is controlled to take either a high-impedance or outputting condition by the data read out from the output control data storage group 3, whereby the output driver 6 thus activated gives the data of "the logic 1" or "the logic 0" to the selection circuit 200 corresponding to the data supplied from the output pattern data storage group 2.

Figure 4:
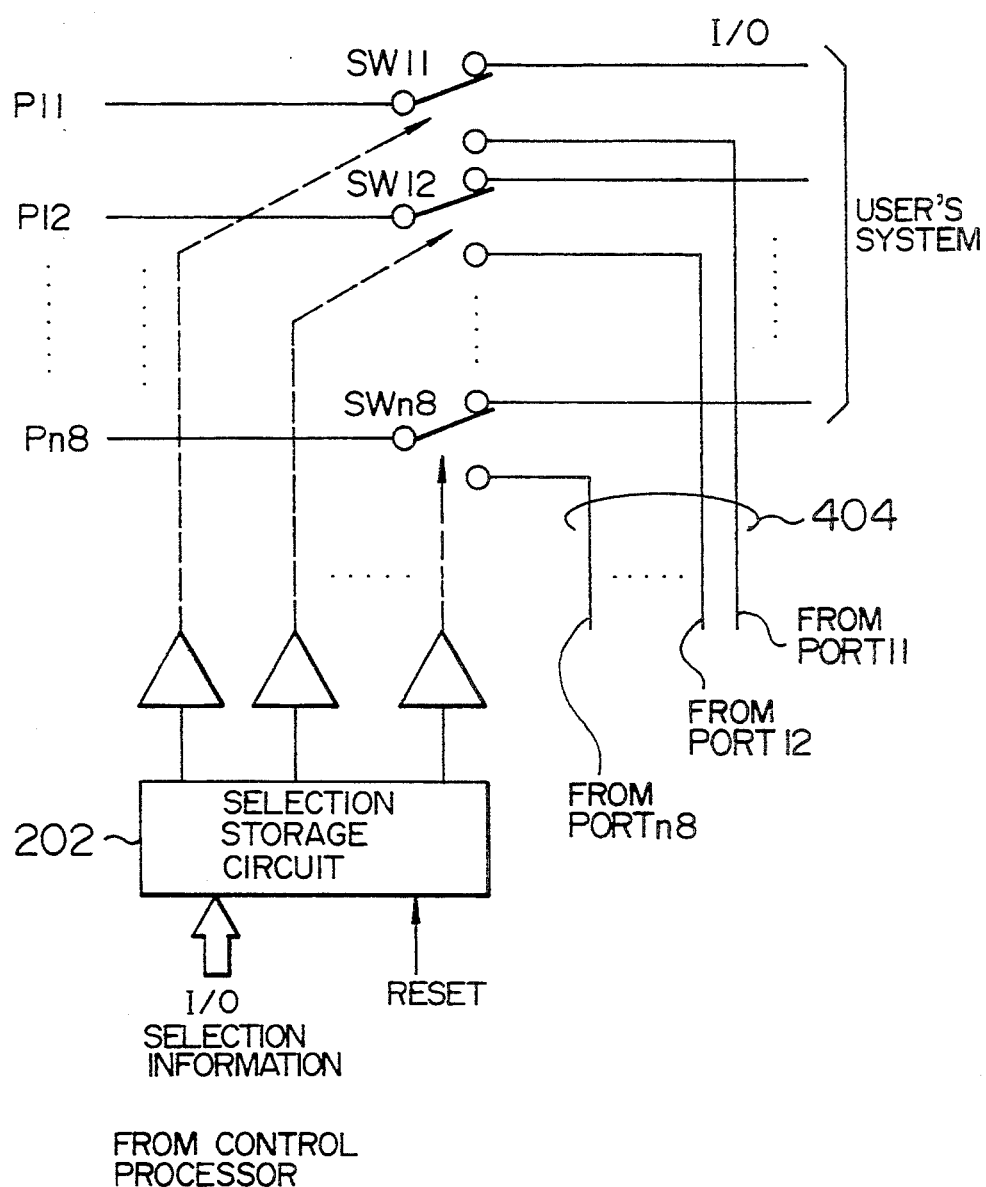
FIG. 4 is a block diagram showing the detail arrangement of one example of a selection circuit.

As shown in FIG. 1 and FIG. 4, the selection circuit 200 enables the information outputted from the output driver 6 of the programmable output circuit 100, instead of the output information of the user's system 400, to be supplied to the microcomputer for emulation 301. In this connection, the selection circuit 200 is made up of a selection switch circuit 201 and a selection storage circuit 202. For example, assuming that ports of the microcomputer for emulation 301 capable of being connected to the user's system 400 are designated by the reference symbols P11 through Pn8 (i.e., its total number is 8×n), as shown in FIG. 4, the selection switch circuit 201 is provided with selection switches SW11 through SWn8 for selectively switching the individual ports P11 through Pn8 or buses 404 to sockets on the side of the user practical system 400, or pseudo-outputs 404 PORT11 through PORTn8 of the programmable output circuit 100 in a one-to-one correspondence manner. Each of the states of the switches SW11 through SWn8 is capable of being controlled in accordance with the I/O selection information stored in the selection storage circuit 202 in a programmable manner. These switches may employ the well-known switches such as read switches or semiconductor switches. Although not limited especially, the I/O selection information to be stored in the selection storage circuit 202 and a reset signal used for resetting the I/O selection information are transmitted by the control of the control processor 307.

The description will subsequently be given to an example of the operation of the emulator.

Figure 5A:
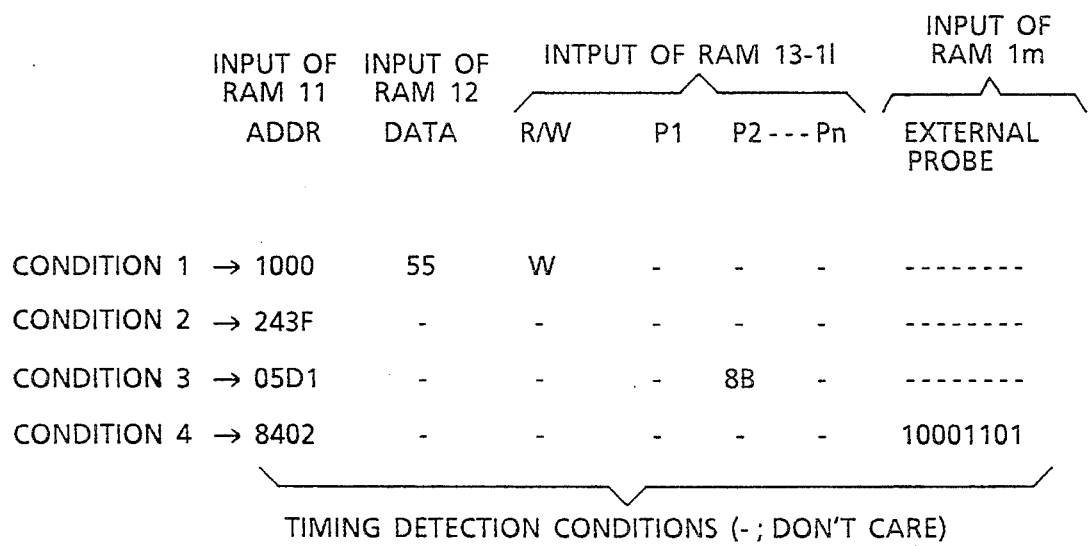
FIGS. 5A and 5B are respectively diagrams useful in explaining an example of timing detection conditions set to a programmable output circuit and corresponding outputs thereof.
Figure 5B:
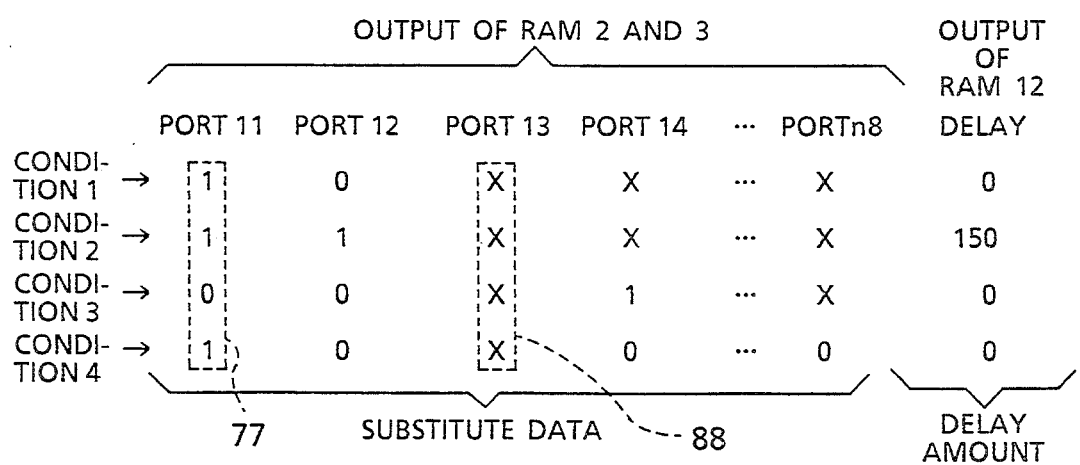

The description will be given to the operation as an example in the case where in a state in which the user's system 400 is incomplete, when the software debug of the I/O program, which is executed by exchanging the information between the partially incomplete I/O apparatus and the microcomputer for emulation 301, and the total software debug covering the whole system are performed, for example, the timing detection conditions as shown in FIGS. 5A and 5B are noticed, and the data are supplied from the programmable output circuit to the microcomputer for emulation in a simulated manner corresponding to the establishment of these conditions.

Four timing detection conditions are shown in FIG. 5A, i.e., a condition 1 through a condition 4. For example, the condition 1 has an access cycle in which the address signal corresponds to "an address 1000", the data are "55", the indication level by the read write signal is "write (W)" and so forth. The condition 2 has a bus cycle in which the address is "243F" and so forth. The condition 3 is a condition wherein the address is "05D1" and the value of the strobe signal P2 is "8B". Moreover, the condition 4 is a condition wherein the address is "8402", and the input 310 which was set to the user practical system and is supplied from the external probe through the switch selection circuit 201 is "10001101". The substitute data which are to be supplied to the microcomputer for emulation 301 corresponding to the conditions 1 through 4 are as tabled corresponding to the individual conditions of FIG. 5B. The two dotted line blocks 77 and 88 are also found in FIGS. 7 and 8 indicating the correspondence of data therebetween for better understandings. Moreover, with the delay amount obtained through the delay counter 5, the condition 2 has "the relative value of 150", and each of the other conditions 1, 3 and 4 has "the relative value of 0". Incidentally, although not shown in the figure, in order to make the delay amount to vary in accordance with the condition, such an arrangement may be designed that a register or the like for holding a plurality of preset values of the delay counter 5 is provided for every condition, and the register is selected corresponding to the parallel output values of the AND gates, AND1 through AND8 shown in FIG. 3 to enable the preset value of the delay counter 5 to be varied.

In FIG. 6, there is shown an example of the storage information of the RAM 11 for setting address conditions within the timing detection conditions of FIG. 5A. In the RAM 11, the condition number code "00000011" meaning "the condition 3" is stored in "the address 05D1" specified by the address signals ADDR0 through ADDR15, the condition number code "00000001" meaning "the condition 1" is stored in "the address 1000" specified by the address signals ADDR0 through ADDR15, the condition number code "00000010" meaning "the condition 2" is stored in "the address 243F" specified by the address signals ADDR0 through ADDR15, and the condition number code "00000100" meaning "the condition 4" is stored in "the address 8402" specified by the address signals ADDR0 through ADDR15. Then, if one of the set conditions in the timing detection circuit 1 is established, the condition code meaning the establishment of the condition need to be outputted from the AND gates AND1 through AND8. Therefore, the data which are stored in the RAM 12 having the data condition set thereto and the RAMs having the other signal conditions set thereto must be determined by considering the don't care condition as well. For example, with respect to the RAM 12 having the data condition set thereto, the condition 1 has the data value "55" as a condition. However, since the condition 2 through the condition 4 have the respective data values of the don't care, the value stored using the data value "55" as an address needs to enable any one of four kinds of condition number codes, i.e., the condition 1 through the condition 4 to be outputted. Therefore, the data stored in the RAM 12 corresponding to the condition 1 using the data value "55" as an address are made to coincide with "00000111". Then, all the data stored using the other data values as addresses are set to "00000110" so as to make the data values coincide with "the don't care" in the condition 2 through the condition 4. The condition setting relating to the strobe signal is also performed in a similar manner. Therefore, when the condition 1 shown in FIG. 5A is established during the emulation operation, the condition number code "00000001" meaning the condition 1 is outputted from the AND gates AND1 through AND8. Similarly, when the condition 2 is established, the condition number code "00000010" meaning the condition 2 is outputted. When the condition 3 is established, the condition number code "00000011" meaning the condition 3 is outputted. When the condition 4 is established, the condition number code "00000100" meaning the condition 4 is outputted. Incidentally, with the bit line written in the present specification, the right end bit coincides with the least significant bit (LSB).

In FIG. 7, there is shown an example of the storage information of the RAM 21 used for outputting data. 256 kinds of addresses from "the address 00" up to "the address FF" are assigned to the RAM 21 by the condition number codes of 8 bits outputted from the output data selection signal latch circuit 4, and the corresponding output pattern data are stored in the RAM 21 using these condition number codes as addresses. More specifically, the data "00000001" are stored using the condition number code "00000001" meaning the condition 1 as an address. The least significant bit "1" of that data corresponds to the logical value of the bit of PORT11 in FIG. 5B. Similarly, the data "00000011" are stored using the condition number code "00000010" meaning the condition 2 as an address, the data "00001000" are stored using the condition number code "00000011" meaning the condition 3 as an address, the data "00000001" are stored using the condition number code "00000100" meaning the condition 4 as an address, and the data "00000000" are stored in each of the other addresses.

In FIG. 8, there is shown an example of the storage information of the RAM 31 used for outputting data. 256 kinds of addresses from "the address 00" up to "the address FF" are assigned to the RAM 31 by the condition number codes of 8 bits outputted from the output data selection signal latch circuit 4, and the corresponding output control data are stored in the RAM 31 using these condition number codes as addresses. More specifically, the data "00000011" are stored using the condition number code "00000001" meaning the condition 1 as an address. "The logic 1" of the least significant bit and the second significant bit corresponds to the case where the outputs of PORT11 and PORT12 in FIG. 5B are not in the high impedance state. Similarly, the data "00000011" are stored using the condition number code "00000010" meaning the condition 2 as an address, the data "00001011" are stored using the condition number code "00000011" meaning the condition 3 as an address, the data "00001011" are stored using the condition number code "00000100" meaning the condition 4 as an address, and the data "00000000" are stored in each of the other addresses.

In FIG. 9, there is shown an example of selection of the output of the programmable output circuit 100 by the selection circuit 200. A case 1 of FIG. 9 is an example wherein the user practical system 400 is not present at all. In this connection, all the ports P11 through Pn8 of the microcomputer for emulation 301 are connected to the outputs ports P11 through Pn8 of the programmable output circuit 100, respectively, by all the switches SW11 through SWn8. As a result, the programmable output circuit 100 is substituted for all the outputs of the user practical system 400 necessary for the emulation. In the case where even if the user practical system 400 is not present at all, the software debug relating to the I/O program is performed, the case 1 is selected.

A case 2 of FIG. 9 is an example wherein the user practical system 400 is provided. In this connection, all the port P11 through Pn8 of the microcomputer for emulation 301 are connected to the user practical system 400 by all the switches SW11 through SWn8. As a result, there is no need for utilizing the programmable output circuit 100, and thus the system debug and the software debug are performed while exchanging the information between the emulator body 300 and the user practical system 400 in the conventional manner.

A case 3 is an example of connection in the case where a part of the user practical system 400 is incomplete. In this connection, the states of the switches SW11 through SWn8 are determined so as to substitute the outputs of the programmable output circuit 100 for the information which is to be outputted essentially from the incomplete portion. The states of the switches at this time can be arbitrarily changed on the basis of the storage contents of the selection storage circuit 202 to which the control information is written in a programmable manner in accordance with the instruction from the side of the host system.

After the programmable output circuit 100 and the selection storage circuit 202 are initialized in the manner as described above, the user program is actually executed to perform the emulation. The information provided on the emulation bus 302 during the emulation operation and the information transmitted from the external probe are supplied as a program execution information to the timing detection circuit 1 on the basis of the bus cycle. When the establishment of one of the above-mentioned conditions 1 through 4 is detected on the basis of such information, the driver selection signal 8 and the output pattern data 9 corresponding to the detected condition are read out and the output pattern data 9 are supplied to the microcomputer for emulation 301 through the output driver 6 activated by the driver selection signal 8 and the predetermined switch. As a result, even if the circuit, on the side of the user practical system 400, which is to output the same information as the pattern data 9 outputted by the establishment of that condition, is not present, it is possible to perform the emulation operation.

Figure 10:
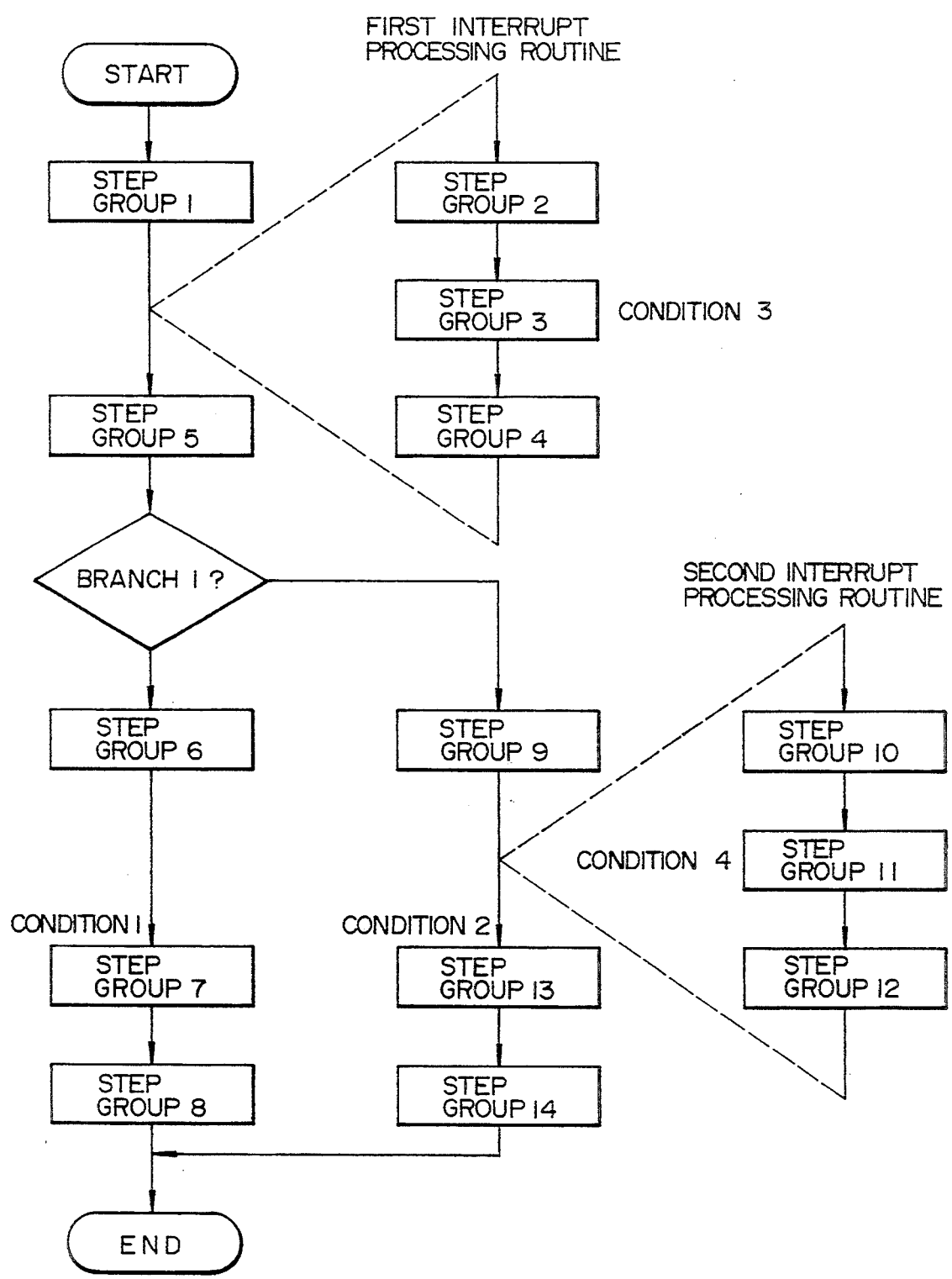
FIG. 10 is a flow chart showing an example of a user program as one unit of emulation.

In FIG. 10, there is shown an example of a flow chart of the user program as one unit of the emulation. This flow chart has a flow from "a process 1" up to "a process 8" as a main routine. In this flow chart, the first interrupt processing routine is asynchronously introduced between "the process 1" and "the process 5", the processing is branched to the flow from "a process 9" to "a process 14" in accordance with the condition judgement result in "a branch 1", and the second interrupt processing routine is asynchronously introduced between "the process 9" and "a process 13". Then, if the condition 1 set to the programmable output circuit 100 in accordance with the conditions shown in FIG. 5A is made to be a condition to be established in "the process 7, the condition 2 is made to be a condition to be established in "the process 13", the condition 3 is made to be a condition to be established in "the process 3", and the condition 4 is made to be a condition to be established in "the process 11", when the software debug is performed with respect to the user program typically shown by the flow of FIG. 10, whichever path the execution of the user program takes, irrespective of occurrence of the interrupt processing routine in the execution flow and the result of the condition judgement in "the branch 1", one of the condition 1 through the condition 4 is established in accordance with that path to enable the necessary information to be supplied to the microcomputer for emulation 301 instead of the user practical system. Thus, the emulation can be completed by executing the user program from the start of the flow to the end thereof. Therefore, there is no need for predicting the program flow to produce the pattern data in the conventional manner. Moreover, in the case where the interruption or the like contrary to the prediction occurs asynchronously, such a situation also does not occur that the emulation circuit cannot be performed normally.

Figure 11:
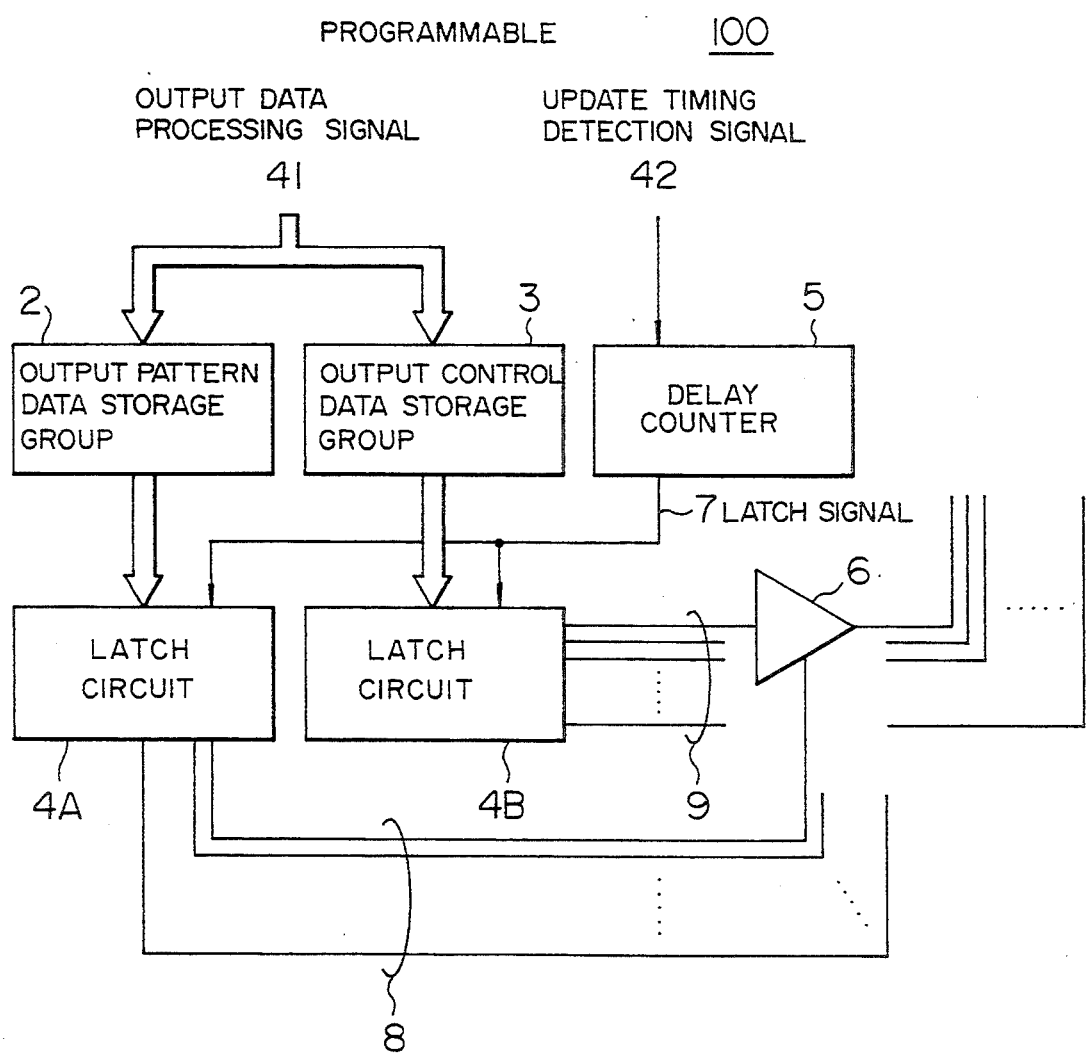
FIG. 11 is a block diagram showing the detail arrangement of another example of the programmable output circuit.

In FIG. 11, there is shown another example of the programmable output circuit 100. That is, as shown in FIG. 11, the programmable output circuit may be designed in such a way that the output data selection signal 41 outputted from the timing detection circuit 1 is directly supplied to both the output control storage group 3 and the output pattern data storage group 2 of which outputs are respectively inputted to latch circuits 4A and 4B thereby to control the output timing.

According to the above embodiment, the following functions can be obtained.

(a) There is provided the programmable output circuit 100 which is capable of setting the conditions for outputting a signal in a simulated manner instead of the user's system 400, and includes the timing detection circuit 1 for detecting the establishment of the conditions thus set during the execution of the target program, and the output pattern data storage group 2 and the output control data storage group 3 for outputting data previously stored in a programmable manner, in accordance with the condition detected by the timing detection circuit 1. Then, the output information of the programmable output circuit 100 is enabled to be supplied, instead of the output information of the user's system 400, to the microcomputer for emulation 301. Therefore, in a state in which the user practical system is incomplete, when the software debug of the I/O program, which is executed by exchanging the information between the partially incomplete I/O apparatus and the microcomputer for emulation 301, the total system debug covering the whole system, and the like are performed, if the condition of the timing at which the programmable output circuit 100 for simulating a signal from the incomplete portion is to output the signal to the microcomputer for emulation 301 is set in a programmable manner by the address value, the data value and the like provided on the emulation bus 302 or the external probe line 310, the timing detection circuit 1 having the condition set thereto detects that condition from the data value and the like on the emulation bus 302 during the execution of the target program, whereby it is possible to supply the corresponding data, which are previously stored in the output pattern data storage group 2 and the output control data storage group 3, to the microcomputer for emulation 301 in a simulated manner.

Thus, since the pseude-signal is supplied to the microcomputer for emulation 301 depending on whether or not the conditions set to the programmable output circuit 100 are established, there is no need for predicting whichever instruction execution flow the processing follows in the process of establishment of the set conditions. Moreover, even if the execution flow is contrary to the prediction, the emulator can be performed by supplying the desired information to the microcomputer for emulation 301 in the necessary operation state. Therefore, even if the user practical system 100 is incomplete, the software debug and the system debug can be performed in a relatively simple manner and surely by giving the necessary information to the microcomputer for emulation 301.

(b) The timing detection circuit 1 is made up of the RAMs 11 through 1m, to which the desired conditions can be written in a programmable manner through the control processor 307 and which is read and accessed during the emulation operation by the data signal, the address signal, the strobe signal and the like inputted or outputted to or from the microcomputer for emulation 301, the logic circuits AND1 through AND8 for detecting the establishment of the conditions by receiving as the inputs thereof the outputs of the RAMs 11 through 1m, and the like, whereby it is possible to construct the timing detection circuit in a relatively simple manner.

(c) There is provided the delay counter 5 for arbitrarily delaying the output timing of the programmable output circuit 100 with respect to the detection timing of the timing detection circuit 1, whereby it is possible to perform the timing setting for making the amount of the transmission delay of the information supplied from the programmable output circuit 100 match with that of the transmission delay of the information actually supplied from the user's system 400 through the interface cable.

(d) The selection circuit 200 includes the selection switches SW11 through SWn8 which are provided in the respective signal lines for interfacing the microcomputer for emulation 301 to the user's system 400 and are capable of switching the selection circuit to the outputs of the programmable output circuit 100, and the connection states of the individual switches SW11 through SWn8 can be controlled in a programmable manner in accordance with the information held in the selection storage circuit 202, whereby it is possible to obtain high degree of freedom with which the emulation can be performed by using the programmable output circuit 100 with the user practical system 400 or by using only the user practical system 400.

While the invention made by the present inventor has been described in detail on the basis of the preferred embodiment, the present invention is not intended to be limited thereto or thereby. That is, it is to be understood that variations may be made by one skilled in the art without departing from the split and scope of the present invention.

For example, in the above-mentioned embodiment, the description has been given to the arrangement in which the programmable output circuit 100 is initialized by the control processor 307. However, alternatively, such an arrangement may be designed that no control processor is provided, and the operation program space of the microcomputer for emulation is switched from the user program space to the system program space to perform the initialization on the basis of the system program. Moreover, the logic circuit of the timing detection circuit is not intended to be limited to the AND gate, and it can be changed to the suitable logic depending on the relation to how to program the don't care condition. Further, it is possible to freely determine whether or not the input, i.e. an address bus or a data bus from the external probe is used to judge whether or not the set condition is established in the timing detection circuit.

Figure 12:
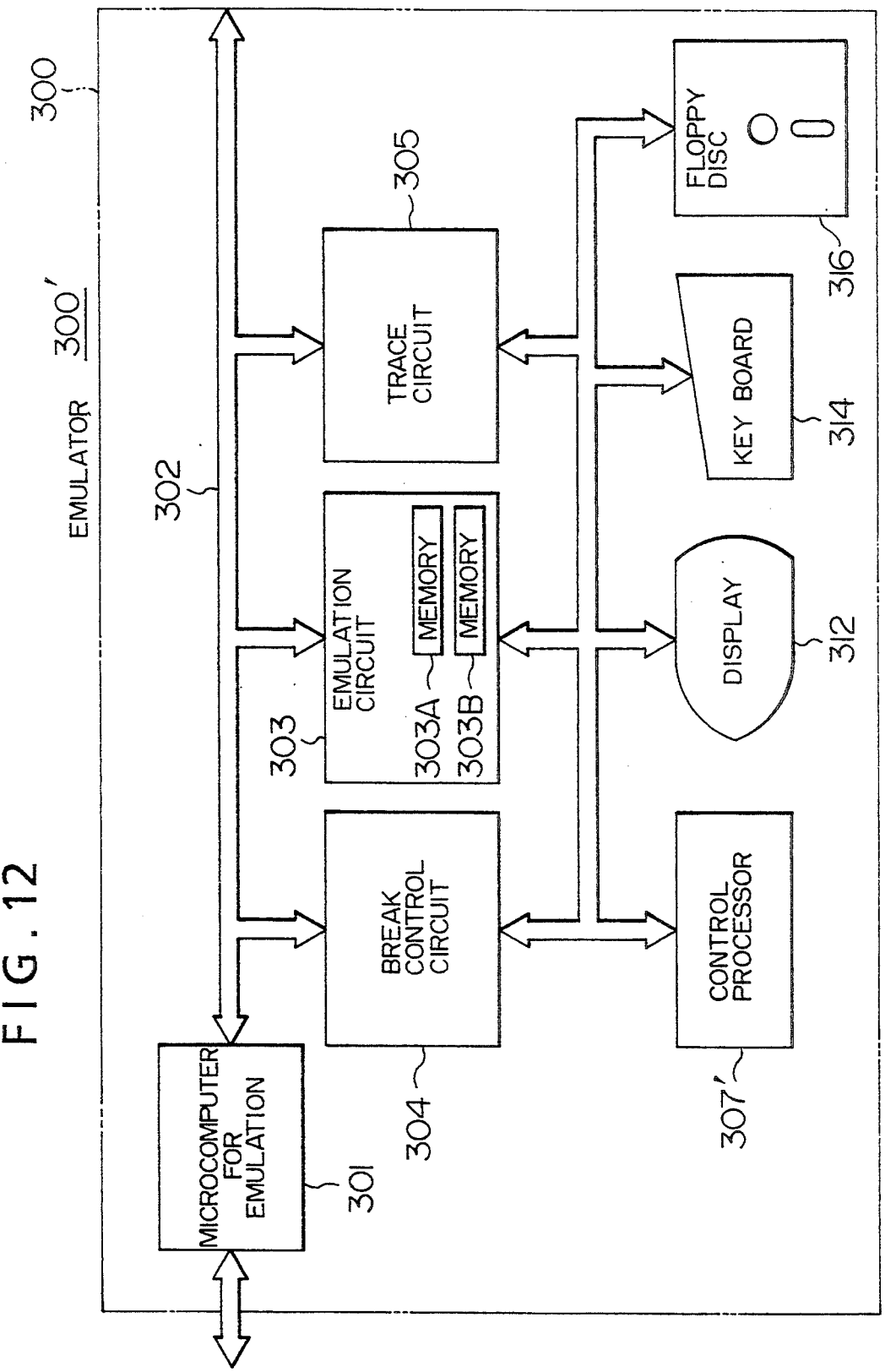
FIG. 12 is a block diagram showing the arrangement of another embodiment of the emulator body.

An emulator 300' shown in FIG. 12 is another embodiment in which a controlling processor 307' is used for the system development or the preparation of the machine language program. To the bus 306 are connected a display 312, a keyboard 314 and a disc storage 316. Therefore, it is possible to emulate the user's system without connecting the apparatus 309 shown in FIG. 1.

The description has been given to the specific case where the invention made by the present inventor is mainly applied to the emulator in which the single chip type microcomputer including a peripheral circuit, which relates to a field of utilization and forms the background of the invention, is used in the form of the microcomputer for emulation. However, the present invention is not intended to be limited thereto or thereby. That is, it is to be understood that the present invention may also be applied to the emulator having a multichip type microcomputer for emulation mounted therein.

The present invention may be widely applied to an apparatus which is effectively substituted for at least the signal output facility of the target system in a programmable manner.

The process in which the objects of the present invention are attained in the apparatus of the invention will be described simply in the following manner.

That is, since the pseudo-signal is supplied to the microcomputer for emulation depending on whether or not the conditions set to the programmable output circuit are established, the signal output facility of the target system can be substituted in a programmable manner without accurately predicting the execution flow of the target program. There is no need for predicting whichever instruction execution flow the processing follows in the process of establishment of the set conditions. Moreover, there is provided an effect in which even if the execution flow is contrary to the prediction, the emulation can be performed by supplying the desired information to the microcomputer for emulation in the necessary operation state. As a result, in a state in which the target system is incomplete, when the software debug of the I/O program, which is executed by exchanging the information between the partially incomplete I/O apparatus and the microcomputer for emulation, and the total system debug covering the whole system are performed, the software debug and the system debug can be performed in a relatively simple manner and surely by giving the necessary information to the microcomputer for emulation.

The timing detection means is made up of the RAMs to which the desired conditions can be written in a programmable manner and which is read and accessed by the data signal, the address signal and the strobe signal inputted or outputted to or from the microcomputer for emulation, the logic circuits for detecting the establishment of the conditions by receiving as the inputs thereof the outputs of the RAMs, and the like, whereby it is possible to construct the timing detection means in a relatively simple manner.

By providing the delay means for arbitrarily delaying the output timing of the programmable output circuit with respect to the detection timing of the timing detection circuit, it is possible to perform the timing setting for making the amount of the transmission delay of the information supplied from the programmable output circuit match with that of the transmission delay of the information actually supplied from the target system through the interface cable.

The selection circuit includes the selection switches which are provided in the respective signal lines for interfacing the microcomputer for emulation to the target system and are capable of switching the respective signal lines to the outputs of the programmable output circuit, and the connection states of the individual switches can be controlled in a programmable manner in accordance with the information held in the storage circuit, whereby it is possible to obtain high degree of freedom with which the emulation can be performed by using the programmable output circuit with the target system or by using only the target system.

What is claimed is:

1. An emulation apparatus having a pattern data storage, comprising:
   an emulator connected to a target machine to be emulated and having a CPU for emulating said target machine and for giving an I/O port information signal and an address signal to perform data processing and a break control circuit for breaking the operation of said CPU;
   detection means connected to said emulator for receiving the address signal from said emulator to access one of a plurality of corresponding predetermined pattern data;
   data storage means connected to said detection means and accessed with any of the plurality of predetermined pattern data to provide a data output; and
   selection means connected between said target machine and said emulator for selectively connecting one of said data output from said data storage means and a data output from said target machine to said emulator in accordance with the I/O port information signal, wherein said emulator substitutes a predetermined portion of said data output from said data storage means for a portion of said data output from said target machine when said portion of said data output from said target machine is incomplete.

2. The emulation apparatus according to claim 1, further comprising:
   delay circuit means connected to said detection means for generating a delay signal which is delayed by a period of time set corresponding to the address signal; and
   latch means connected to said delay circuit means for delaying an output facility of said data storage means in accordance with the delay signal.

3. The emulation apparatus according to claim 1, further comprising:
   signal paths connected to said data storage means and said detection means for transmitting therethrough signals used for emulation in said data storage means and said detection means.

4. The emulation apparatus according to claim 1, wherein said selection means includes a plurality of switches corresponding to individual connections between said emulator and said target machine; and said selection means includes a selection storage circuit for storing information used for activating said plurality of switches.

5. The emulation apparatus according to claim 4, wherein said emulator includes a control processor for supplying the predetermined pattern data to said selection storage circuit to activate said CPU for the emulation operation.

6. An emulation method of connecting an emulator having a CPU and a break control circuit for breaking the operation of said CPU to a target system to emulate a signal output facility of said target system by said CPU, comprising the computer implemented steps of:
   inputting an address signal from said emulator to a memory disposed in said emulator to provide corresponding predetermined pattern data;
   accessing data storage means connected to said memory, with the predetermined pattern data as an input signal, and retrieving data output from said data storage means; and
   selectively connecting one of the data output from said data storage means and a data output from said target system to said emulator in accordance with an I/O port information signal from said emulator, wherein said emulator substitutes a portion of said data output from said data storage means for a portion of said data output from said target system when said portion of said data output from said target system is incomplete.

7. The emulation method according to claim 6, further comprising the step of:
   delaying an output facility of said storage means corresponding to a predetermined delay signal.

8. The emulation method according to claim 6, further comprising the step of:
   storing previously determined data for emulation in said data storage means.

9. The emulation method according to claim 6, further comprising the step of:
   activating a plurality of switches, disposed between said emulator, said target system and said data storage means, so as to connect said emulator to said target system or said data storage means.

10. In an emulator apparatus having a pattern data storage and a CPU for emulating a target system and for providing an I/O port information signal and an address signal, an emulation method of selectively connecting a plurality of target I/O information signals from the target system to be emulated to emulator apparatus through a selection circuit, the method comprising the computer implemented steps of:
    detecting an incomplete signal among said plurality of target I/O information signals and generating said I/O port information signal when said incomplete signal is detected;
    accessing the pattern data storage using said address signal when the incomplete signal is detected and retrieving a substitute data signal from said pattern data storage; and,
    selectively connecting, by a selection circuit, the substitute data signal from said pattern data storage in place of the incomplete signal of the plurality of target I/O information signals from the target system to said emulator apparatus, said emulator being configured to emulate the target system using the substitute data signal from said pattern data storage in place of the incomplete signal based on said I/O port information signal.

* * * * *